(12) United States Patent
Yoshida et al.

(10) Patent No.: US 12,444,304 B2
(45) Date of Patent: Oct. 14, 2025

(54) DRIVING ASSISTANCE DEVICE AND METHOD, AND STORAGE MEDIUM IN WHICH PROGRAM IS STORED

(71) Applicant: NTT, Inc., Tokyo (JP)

(72) Inventors: Manabu Yoshida, Musashino (JP); Yuki Yokohata, Musashino (JP); Kouhei Mori, Musashino (JP); Takahiro Hata, Musashino (JP); Ippei Shake, Musashino (JP)

(73) Assignee: NTT, Inc., Tokyo (JP)

( * ) Notice: Subject to any disclaimer, the term of this patent is extended or adjusted under 35 U.S.C. 154(b) by 769 days.

(21) Appl. No.: 17/263,837

(22) PCT Filed: Jul. 25, 2019

(86) PCT No.: PCT/JP2019/029246
§ 371 (c)(1),
(2) Date: Jan. 27, 2021

(87) PCT Pub. No.: WO2020/026940
PCT Pub. Date: Feb. 6, 2020

(65) Prior Publication Data
US 2021/0390847 A1    Dec. 16, 2021

(30) Foreign Application Priority Data

Jul. 31, 2018  (JP) ................. 2018-143753

(51) Int. Cl.
*G08G 1/16* (2006.01)
*G05B 13/02* (2006.01)
(Continued)

(52) U.S. Cl.
CPC ......... *G08G 1/166* (2013.01); *G05B 13/0265* (2013.01); *G06F 18/253* (2023.01);
(Continued)

(58) Field of Classification Search
None
See application file for complete search history.

(56) References Cited

U.S. PATENT DOCUMENTS

| 2009/0034559 | A1* | 2/2009 | Jung | H04N 21/4305 |
| | | | | 370/512 |
| 2016/0078758 | A1* | 3/2016 | Basalamah | G08G 1/0141 |
| | | | | 701/118 |
| 2018/0325442 | A1* | 11/2018 | Lee | A61B 5/18 |

FOREIGN PATENT DOCUMENTS

| EP | 3499480 A1 | 6/2019 |
| JP | 2000293670 A | 10/2000 |

(Continued)

OTHER PUBLICATIONS

Chen, Chenyi, et al. "DeepDriving: Learning Affordance for Direct Perception in Autonomous Driving", 2015, Proceedings of the IEEE international conference on Computer Vision (ICCV), 2722-2730 (Year: 2015).*

(Continued)

*Primary Examiner* — Hongye Liang
(74) *Attorney, Agent, or Firm* — Harness, Dickey & Pierce, P.L.C.

(57) ABSTRACT

A driving assistance device includes a hardware processor and a memory, in which the hardware processor is configured to execute: acquiring image data captured in a vehicle and sensor data relating to a driving operation; converting an image in each frame included in the image data into an image feature amount indicated by the image; combining the image feature amount and the acquired sensor data; performing, based on the combined data, a learning process for a driving assistance information learning model used when a target value relating to the driving operation by a driver of the vehicle is generated from the image feature amount included in the combined data; and generating, when new (Continued)

image data captured in the running vehicle is acquired, the target value relating to the driving operation based on the image feature amount converted from the acquired new image data and the driving assistance information learning model.

14 Claims, 14 Drawing Sheets

(51) Int. Cl.
  *G06F 18/25* (2023.01)
  *G06V 10/44* (2022.01)
  *G06V 10/764* (2022.01)
  *G06V 10/774* (2022.01)
  *G06V 10/80* (2022.01)
  *G06V 10/82* (2022.01)
  *G06V 20/56* (2022.01)
  *G06V 40/10* (2022.01)
  *G08G 1/01* (2006.01)
  *G08G 1/0967* (2006.01)

(52) U.S. Cl.
  CPC .......... *G06V 10/454* (2022.01); *G06V 10/764* (2022.01); *G06V 10/774* (2022.01); *G06V 10/806* (2022.01); *G06V 10/82* (2022.01); *G06V 20/56* (2022.01); *G06V 40/103* (2022.01); *G08G 1/0112* (2013.01); *G08G 1/096791* (2013.01)

(56) References Cited

FOREIGN PATENT DOCUMENTS

| JP | 2007265292 A | | 10/2007 |
|---|---|---|---|
| JP | 201825898 A | | 2/2018 |
| JP | 2018092525 | * | 6/2018 |
| JP | 2018092525 A | | 6/2018 |

OTHER PUBLICATIONS

Nikkei xTech (Cross-Tech), "HERE having 80% Share in Europe and the U.S., Steadily Preparing for Map for Automated Driving", http://tech.nikkeibp.co.jp/dm/article/NEWS/20150714/427640/?P=3.
Redmon, J. et al, "UOLO9000: Better, Faster, Stronger", submitted Dec. 25, 2016, https://arxiv.org/abs/1612.08242.
International Search Report issued in PCT/JP2019/029246, mailed on Oct. 21, 2019.
Mizutani, Kimihiro et al., "A Car Accelerate Adjustment System Based On Deep Reinforcement Learning" Electronic Information and Communication Society General Conference A-14-14, Tokyo, Japan, Mar. 6, 2018, p. 124.
Xu, Huazhe et al., "End-to-end Learning of Driving Models from Large-scale Video Datasets", IEEE Conference on Computer Vision and Pattern Recognition (2017).

* cited by examiner

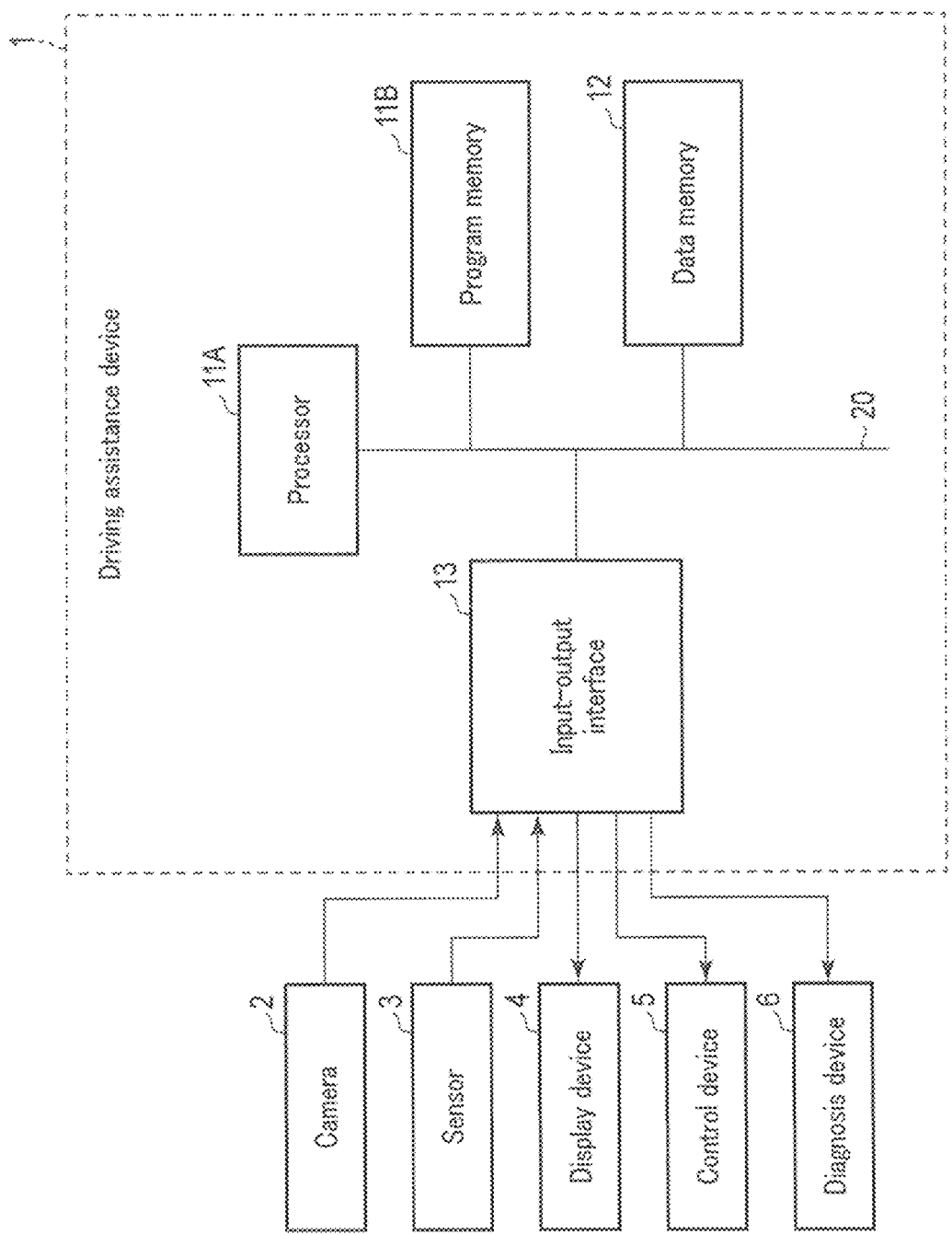
F I G. 1

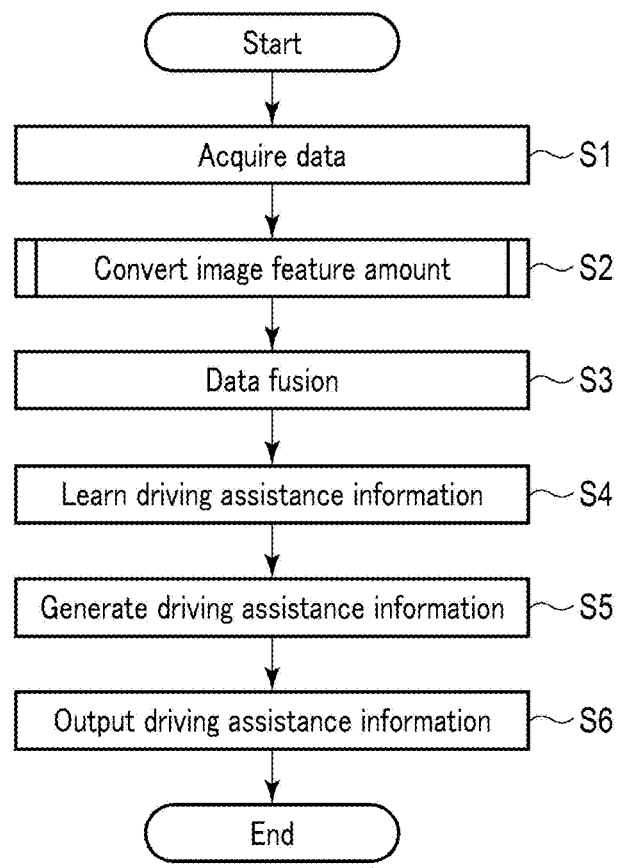
F I G. 4
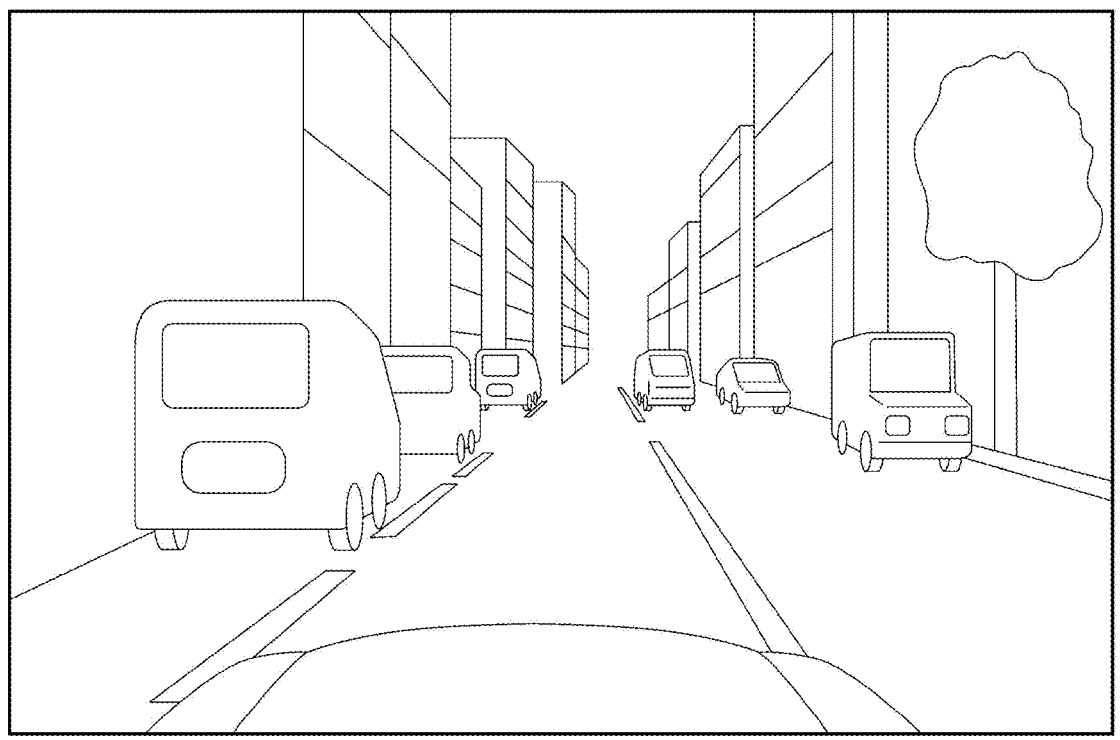
F I G. 5

| Time | Image feature amount |
|---|---|
| 2017/12/1 9:00:00 | 2 |
| 2017/12/1 9:00:01 | 2 |
| 2017/12/1 9:00:02 | 1 |
| 2017/12/1 9:00:03 | 3 |
| 2017/12/1 9:00:04 | 3 |
| ... | ... |

FIG. 8

| Time | Speed (km/h) | Image feature amount |
|---|---|---|
| 2017/12/1 9:00:00 | 31 | 2 |
| 2017/12/1 9:00:01 | 31 | 2 |
| 2017/12/1 9:00:02 | 32 | 1 |
| 2017/12/1 9:00:03 | 35 | 3 |
| 2017/12/1 9:00:04 | 36 | 3 |
| ... | ... | ... |

FIG. 9

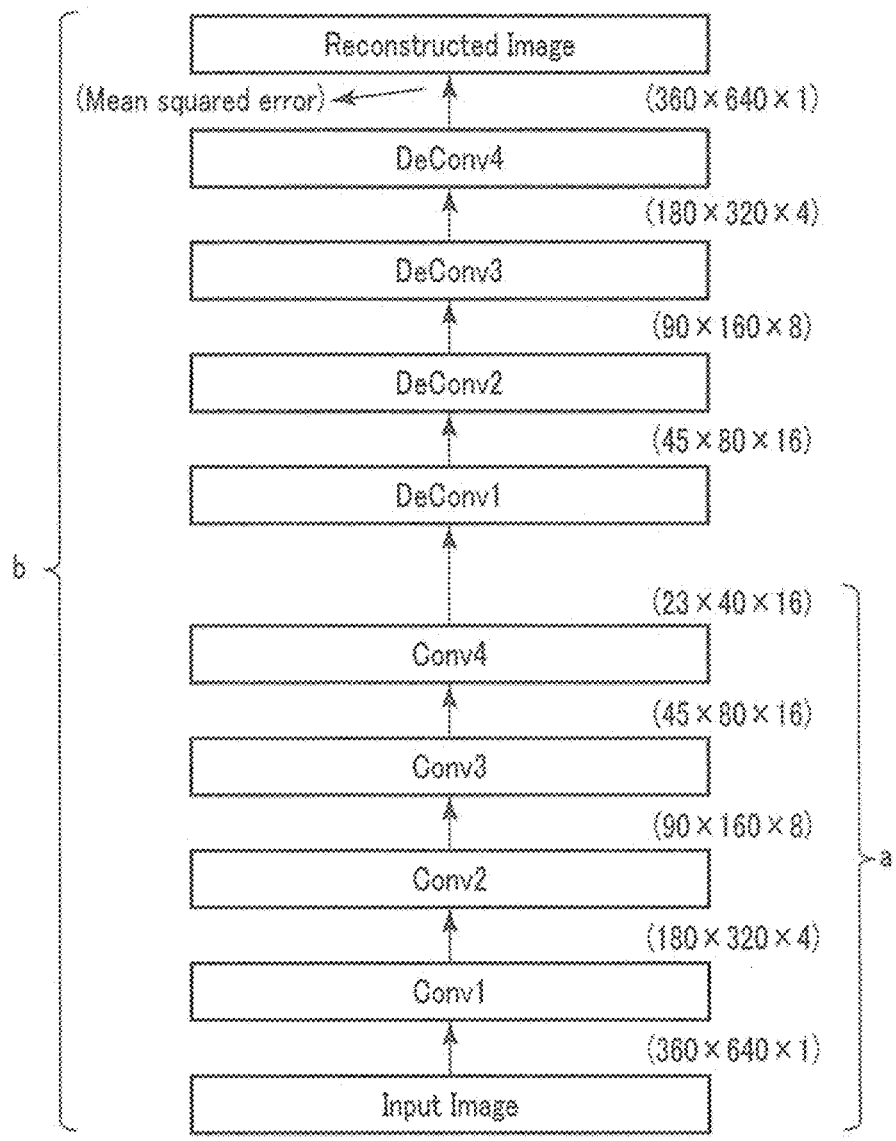
F I G. 11

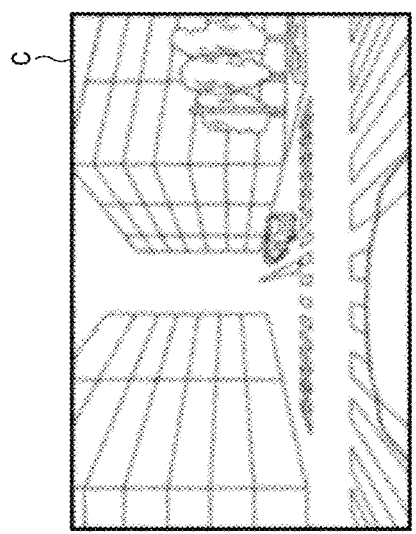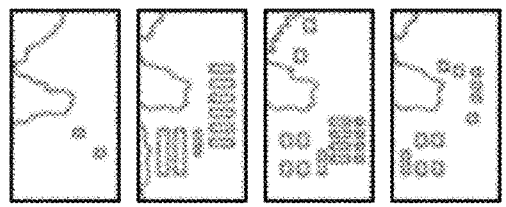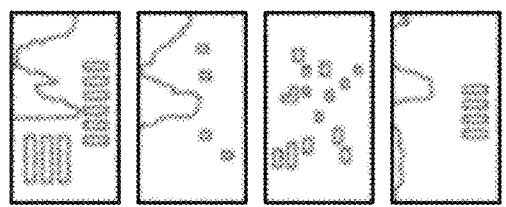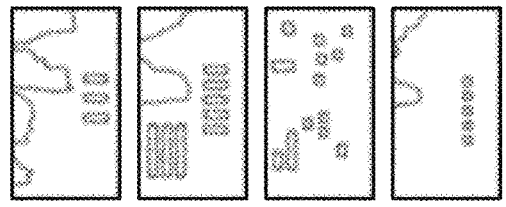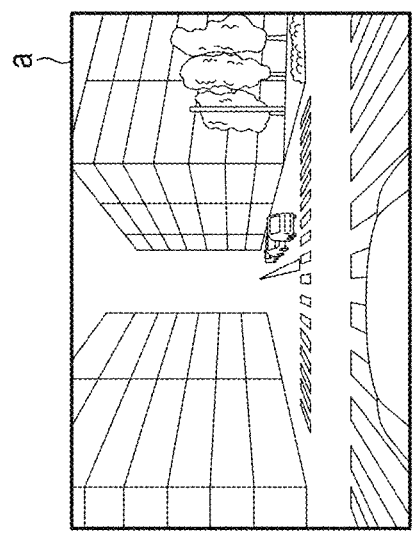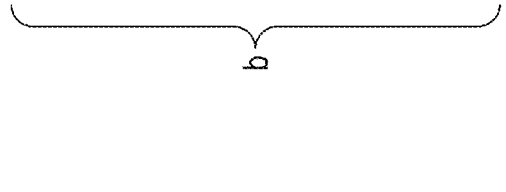
FIG. 16

| Time | Speed (km/h) | Image feature amount |
|---|---|---|
| 2017/12/1 09:00:00 | 31 | 2 |
| 2017/12/1 09:00:01 | 31 | 2 |
| 2017/12/1 09:00:02 | 32 | 1 |
| 2017/12/1 09:00:03 | 35 | 3 |
| 2017/12/1 09:00:04 | 36 | 3 |
| ... | ... | ... | a

| \<Explanatory variable\> | \<Explanatory variable\> | \<Objective variable\> |
|---|---|---|
| Speed (km/h) | Image feature amount | Objective variable of t+1 |
| 31 | 2 | 31 |
| 31 | 2 | 32 |
| 32 | 1 | 35 |
| 35 | 3 | 36 |
| 36 | 3 | ... | b

| \<Explanatory variable\> | \<Explanatory variable\> | \<Objective variable\> |
|---|---|---|
| Speed (km/h) | Image feature amount | Objective variable of t+1 |
| 31 | 2 | Constant speed |
| 31 | 2 | Acceleration |
| 32 | 1 | Acceleration |
| 35 | 3 | Acceleration |
| 36 | 3 | ... | c

F I G. 17

DRIVING ASSISTANCE DEVICE AND METHOD, AND STORAGE MEDIUM IN WHICH PROGRAM IS STORED

CROSS-REFERENCE TO RELATED APPLICATIONS

This is a U.S. national phase application under 35 USC 371 of international application PCT/JP2019/029246, filed on Jul. 25, 2019, which claims priority to Japanese patent application No. 2018-143753, filed on Jul. 31, 2018. The entire disclosures of the above applications are incorporated herein by reference.

FIELD

Embodiments of the present invention relate to a driving assistance device and method, and a storage medium in which a program is stored.

BACKGROUND

In recent years, connected cars configured to transmit their vehicle data to cloud environments on the Internet in real time have attracted attention. If a large amount of vehicle data is collected from multiple connected cars, it is possible to grasp road conditions such as congestion information in real time in a town, and detect an abnormal state such as a traffic accident. Thus, early improvement of traffic conditions and advanced measures are expected to be realized using connected cars.

In addition, use of vehicle data has been discussed from the viewpoint of increasing sophistication of maps. If an automobile has an in-vehicle camera, it is possible to acquire image data of the front of the vehicle as viewed from the vehicle as vehicle data, and to automatically extract sign information in a town or quickly grasp a situation of a traffic accident as an image. Furthermore, it has been proposed to aim to realize automatic driving that is closer to human driving by recording a driving operation during travel (for example, see Non Patent Literature 1).

For recording a driving operation during travel and using the recorded data for drive assistance or automated driving, for example, functions such as learning vehicle speed data at a certain position, setting it as a target speed, and presenting this speed as a recommended speed to a driver are considered.

CITATION LIST

Non Patent Literature

Non Patent Literature 1: NIKKEI xTECH (Cross-Tech), "HERE having 80% Share in Europe and the U.S., Steadily Preparing for Map for Automated Driving", http://tech.nikkeibp.co.jp/dm/article/NEWS/20150714/427640/?P=3

SUMMARY

Technical Problem

To learn vehicle speed data at a certain position and set it as a target speed, it is necessary to acquire and accumulate a plurality of pieces of vehicle data for the same position as learning data. Therefore, there has been a problem in which a target speed cannot be easily set for a road for which there is no or a small amount of vehicle data.

Even when there is sufficient vehicle data, data that can be used as a target speed requires a small speed variation. Thus, in consideration of the fact that a running speed varies depending on the surrounding environment in normal running, there has been a problem in which areas for which a target speed can be set are extremely limited with respect to enormous travel areas.

This invention has been made focusing on the above-described circumstances, one aspect of which is to provide a technique capable of dynamically setting driving assistance information in accordance with a surrounding environment.

Solution to Problem

A driving assistance device according to an aspect of the present invention is a driving assistance device comprising a hardware processor and a memory, the hardware processor configured to execute: acquiring image data captured in a running vehicle, and sensor data relating to a driving operation by a driver of the vehicle; converting an image in each frame included in the acquired image data into an image feature amount indicated by the image; combining the image feature amount and the acquired sensor data; and performing, based on the combined data, a learning process for a driving assistance information learning model used when a target value relating to the driving operation by the driver of the vehicle is generated from the image feature amount included in the combined data, the memory comprising: a driving assistance information learning model storage unit that stores the driving assistance information learning model subjected to the learning process, the hardware processor configured to execute: generating, when new image data captured in the running vehicle is acquired, the target value relating to the driving operation by the driver of the vehicle, as driving assistance information of the vehicle, based on the image feature amount converted from the acquired new image data and the driving assistance information learning model stored in the driving assistance information learning model storage unit.

A driving assistance method according to an aspect of the present invention is a method executed by a driving assistance device including a hardware processor, the method comprising: acquiring image data captured in a running vehicle and sensor data relating to a driving operation by a driver of the vehicle; converting an image in each frame included in the acquired image data into an image feature amount indicated by the image; combining the converted image feature amount and the acquired sensor data; performing, using the combined data, a learning process for a driving assistance information learning model used when a target value relating to the driving operation by the driver of the vehicle is generated from the image feature amount included in the combined data; and generating, when new image data captured in the running vehicle is acquired, the target value relating to the driving operation by the driver of the vehicle, as driving assistance information of the vehicle, based on the image feature amount converted from the acquired new image data and the driving assistance information learning model.

A computer-readable storage medium according to an aspect of the present invention is a non-transitory tangible computer-readable storage medium having stored thereon a program for causing a hardware processor to execute: acquiring image data captured in a running vehicle and sensor data relating to a driving operation by a driver of the vehicle; converting an image in each frame included in the acquired image data into an image feature amount indicated by the image; combining the converted image feature amount and the acquired sensor data; performing, using the combined data, a learning process for a driving assistance information learning model used when a target value relating to the driving operation by the driver of the vehicle is generated from the image feature amount included in the combined data; and generating, when new image data captured in the running vehicle is acquired, the target value relating to the driving operation by the driver of the vehicle, as driving assistance information of the vehicle, based on the image feature amount converted from the acquired new image data and the driving assistance information learning model.

Advantageous Effects of Invention

According to the present invention, it is possible to dynamically set driving assistance information according to a surrounding environment.

BRIEF DESCRIPTION OF THE DRAWINGS

FIG. 1 is a block diagram illustrating an example of a hardware configuration of a driving assistance device according to an embodiment of the present invention;

FIG. 4 is a flowchart illustrating an example of a processing procedure of the driving assistance device according to the first embodiment of the present invention;

FIG. 5 illustrates an example of a camera image handled by the driving assistance device according to the first embodiment of the present invention;

FIG. 8 illustrates, in a table format, a configuration example of data stored in an image feature amount storage unit of the driving assistance device according to the first embodiment of the present invention;

FIG. 9 illustrates, in a table format, a configuration example of data combined by a data fusion unit of the driving assistance device according to the first embodiment of the present invention;

FIG. 11 illustrates an example of a learning method by an image feature amount learning unit of the driving assistance device according to the second embodiment of the present invention;

FIG. 16 illustrates an example of an encoding result and a decoding result by the image feature amount learning unit of the driving assistance device according to the second embodiment of the present invention;

FIG. 17 illustrates an example of setting of an objective variable and an explanatory variable by a driving assistance information learning unit of a driving assistance device according to a third embodiment of the present invention.

DETAILED DESCRIPTION

Figure 2:
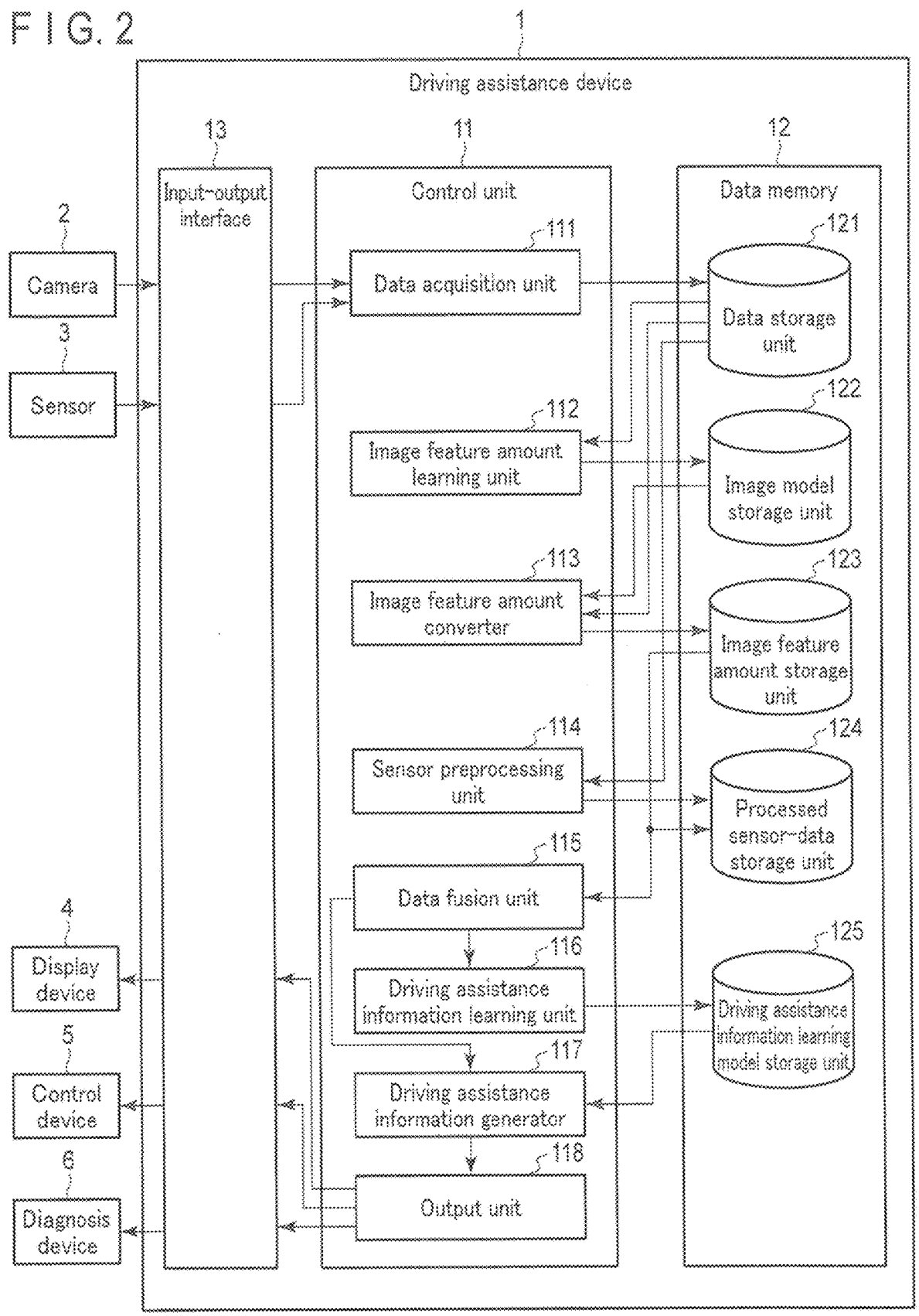
FIG. 2 is a block diagram illustrating an example of a software configuration of a driving assistance device according to an embodiment of the present invention.

Hereinafter, embodiments of the present invention will be described with reference to the accompanying drawings.
(Configuration)
(1) Hardware Configuration FIG. 1 is a block diagram illustrating an example of a hardware configuration of a driving assistance device 1 according to an embodiment of the present invention. FIG. 1 illustrates a configuration according to any one of first to fifth embodiments described below.

The driving assistance device 1 is configured by, for example, a server computer or a personal computer, and includes a hardware processor 11A such as a central processing unit (CPU). In the driving assistance device 1, a program memory 11B, a data memory 12, and an input-output interface 13 are connected to the hardware processor 11A via a bus 20.

A camera 2, sensor 3, display device 4, control device 5, and diagnosis device 6 can be connected to the input-output interface 13.

The input-output interface 13 includes, for example, one or more wired or wireless communication interfaces. The input-output interface 13 inputs, into the driving assistance device 1, a camera image captured by the camera 2 mounted on the automobile and recorded by a drive recorder (not shown) mounted on the automobile, or sensor data detected by the sensor 3 mounted on the automobile. The camera 2 may use, for example, a solid-state imaging device such as a charge coupled device (CCD) or a complementary metal oxide semiconductor (CMOS) sensor. The automobile may be other types of vehicles.

Furthermore, the input-output interface 13 outputs data output from the driving assistance device 1 to the outside. The device that captures and records the camera image is not limited to the camera 2 and the drive recorder, and may be a mobile terminal such as a smartphone with a camera function or a tablet terminal.

The sensor 3 includes a speed sensor. The sensor 3 may be a smartphone with a sensor function. Data measured by a sensor normally provided for an automobile's operation control or log data collection, such as a controller area network (CAN), may be used as sensor data.

The output destination of the data output from the driving assistance device 1 may be the display device 4 shown in FIG. 1 that displays the data to the driver of the automobile and uses liquid crystal, organic electro luminescence (EL), or the like, the control device 5 shown in FIG. 1 that controls the automobile, or the diagnosis device 6 shown in FIG. 1 that diagnoses the driving of the automobile.

The driving assistance device 1 can be mounted on the automobile together with the camera 2 and the sensor 3. However, the present invention is not limited to this, and may have a configuration in which the driving assistance device 1 is provided on the Web or the cloud, an in-vehicle device having a communication function is mounted on the automobile, and the camera 2, the sensor 3, the display device 4, the control device 5, and the diagnosis device 6 are connected to the in-vehicle device so that communication can be performed between the in-vehicle device and the driving assistance device 1 via a communication network.

The program memory 11B serves as a non-transitory tangible computer-readable storage medium, and may be a combination of a nonvolatile memory such as a hard disk drive (HDD) or a solid state drive (SSD), in which writing and reading can be conducted at any time, and a nonvolatile memory such as a read only memory (ROM). The program memory 11B stores programs necessary for executing various control processes according to the embodiment.

The data memory 12 serves as a tangible computer-readable storage medium, and may be a combination of a nonvolatile memory such as HDD or SSD, in which writing and reading can be conducted at any time, and a volatile memory such as a random access memory (RAN). The data memory 12 is used to store various data items obtained and created in the course of various processes.

(2) Software Configuration

FIG. 2 is a block diagram illustrating an example of a software configuration of the driving assistance device 1 according to an embodiment of the present invention. FIG. 2 shows the software configuration of the driving assistance device 1 in association with the hardware configuration shown in FIG. 1.

The driving assistance device 1 can be configured as a data processing device including a control unit 11 serving as a processing unit, a data memory 12, and an input-output interface 13.

The storage area of the data memory 12 is provided with a data storage unit 121, an image model storage unit (image feature amount learning model storage unit) 122, an image feature amount storage unit 123, a processed sensor-data storage unit 124, and a driving assistance information learning model storage unit 125.

However, the storage units 121 to 125 are not essential components in the driving assistance device 1, and may be provided in, for example, an external storage medium such as a universal serial bus (USB) memory or a storage device such as a database server provided in a cloud.

The control unit 11 includes the hardware processor 11A and the program memory 11B, and includes, as software-based processing function units, a data acquisition unit 111, an image feature amount learning unit 112, an image feature amount converter 113, a sensor preprocessing unit 114, a data fusion unit 115, a driving assistance information learning unit 116, a driving assistance information generator 117, and an output unit 118.

All of the processing functions of these units can be realized by causing the hardware processor 11A to execute the programs stored in the program memory 11B. The control unit 11 may be realized in various other forms including an integrated circuit such as an application specific integrated circuit (ASIC) or a field-programmable gate array (FPGA). These processing functions may be realized by using a program provided through a communication network, instead of being realized by using a program stored in the program memory 11B.

The data acquisition unit 111 implements the process for acquiring a camera image and sensor data via the input-output interface 13, and storing the acquired results in the data storage unit 121 as camera image data and sensor data.

The camera 2 mounted on the automobile can capture an image including the front of the running automobile. The sensor 3 mounted on the automobile can measure at least the running speed of the running automobile. It is assumed that the camera image and the sensor data are synchronized in time with a granularity of at least about one second.

The image feature amount learning unit 112 of the control unit 11 implements the learning process for reading the camera image data stored in the data storage unit 121 of the data memory 12, and obtaining an image feature amount of an image in each frame included in the camera image data.

Thereafter, the image feature amount learning unit 112 obtains, by the above-described learning process, an image feature amount learning model (hereinafter sometimes referred to as an image model) used when an image feature amount is obtained from an image. The image feature amount learning unit 112 stores the image model in the image model storage unit 122 of the data memory 12.

The image feature amount converter 113 reads the camera image data stored in the data storage unit 121 and the image model stored in the image model storage unit 122. The image feature amount converter 113 converts the image in each frame included in the camera image data into an image feature amount indicated by the image. The image feature amount converter 113 stores the converted image feature amount in the image feature amount storage unit 123 of the data memory 12.

The sensor preprocessing unit 114 reads the sensor data stored in the data storage unit 121, and performs, for example, a process of complementing a missing value or a process of correcting an abnormal value on the sensor data. The sensor preprocessing unit 114 stores the result of the above process in the processed sensor-data storage unit 124 of the data memory 12. Note that the sensor preprocessing unit 114 and the processed sensor-data storage unit 124 may not be essential when the driving assistance device 1 performs processing.

The data fusion unit 115 performs a process of combining the image feature amount stored in the image feature amount storage unit 123 of the data memory 12 and the sensor data stored in the processed sensor-data storage unit 124.

The driving assistance information learning unit 116 sets, among the data combined by the data fusion unit 115, the running speed of the automobile indicated by the sensor data as an objective variable, and sets data other than the running speed, e.g., the image feature amount, as an explanatory variable. The driving assistance information learning unit 116 performs, using the data combined by the data fusion unit 115, a learning process for a driving assistance information learning model that is a model used when the objective variable is predicted (generated) from the explanatory variable.

Thereafter, the driving assistance information learning unit 116 stores the driving assistance information learning model obtained by the learning process in the driving assistance information learning model storage unit 125 of the data memory 12. Here, the objective variable may be a variable in which the running speed of the automobile is set as a continuous amount. The objective variable may be a variable in which the relationship of the running speed at a time after the predetermined time to the running speed at the predetermined time corresponding to a driving operation of any one of acceleration, constant speed, or deceleration of the automobile is set as a label. The objective variable may be, for example, a target value of a steering wheel angle of the automobile as long as the target value is related to a driving operation by a driver of the automobile.

The driving assistance information generator 117 reads out, among the data combined by the data fusion unit 115, at least the image feature amount converted by the image feature amount converter 113 from new camera image data, and the driving assistance information learning model stored in the driving assistance information learning model storage unit 125 of the data memory 12, and based on the read image feature amount and the driving assistance information learning model, performs a process of predicting a target value of a future running speed of the automobile as driving assistance information. The driving assistance information may be not only the running speed but also a category such as acceleration, constant speed, or deceleration, or a steering wheel angle.

The output unit 118 outputs the target value of the running speed predicted by the driving assistance information generator 117 to the outside via the input-output interface 13.

First Embodiment

Next, the first embodiment will be described.

Figure 3:
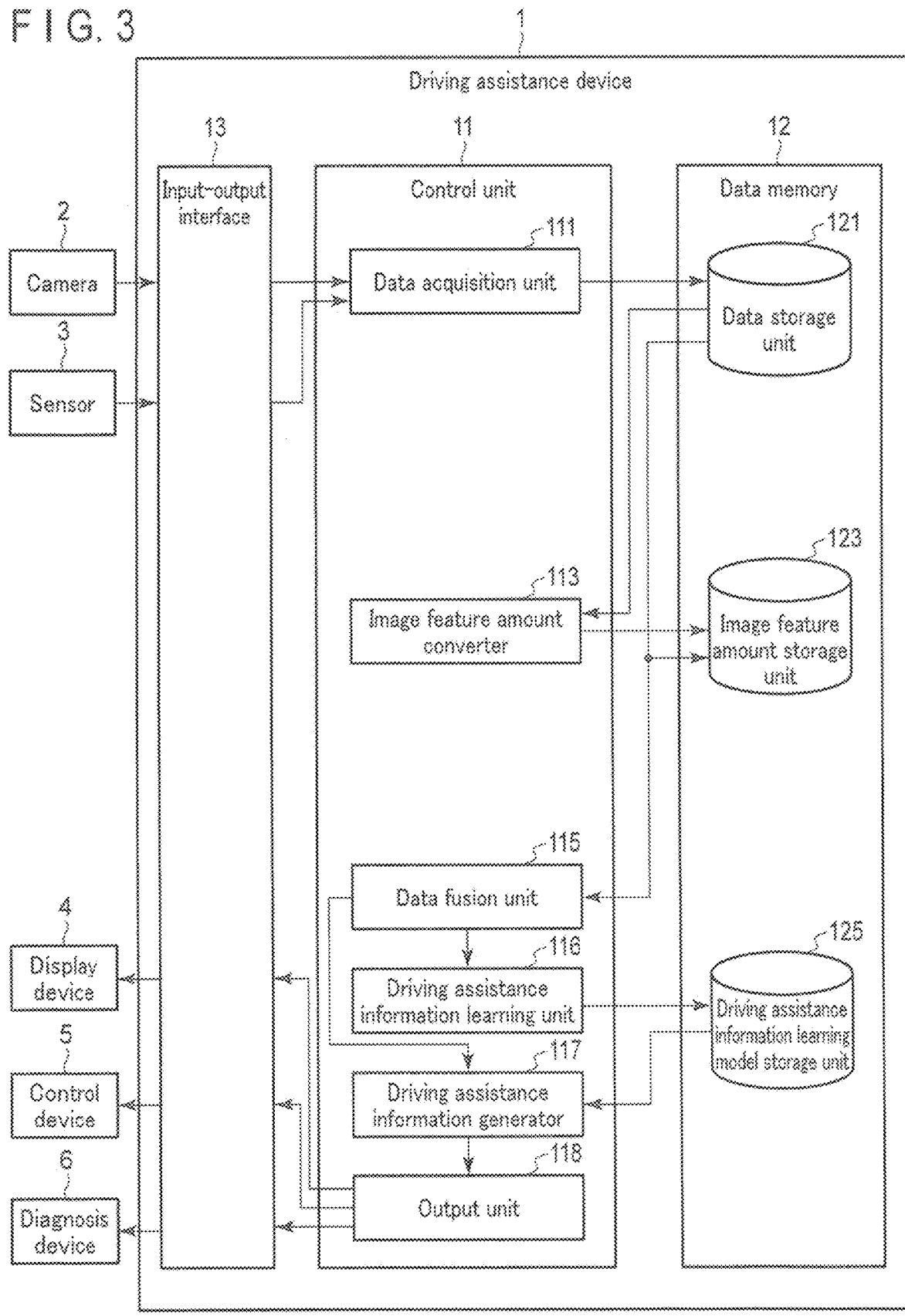
FIG. 3 is a block diagram illustrating an example of a software configuration of a driving assistance device according to a first embodiment of the present invention.

FIG. 3 is a block diagram illustrating an example of the software configuration of the driving assistance device 1 according to the first embodiment of the present invention. FIG. 3 shows the software configuration of the driving assistance device 1 according to the first embodiment in association with the hardware configuration illustrated in FIG. 1.

As illustrated in FIG. 3, in the first embodiment, the software configuration in the software configuration of FIG. 2 other than the image feature amount learning unit 112, the sensor preprocessing unit 114, the image model storage unit 122, and the processed sensor-data storage unit 124 is functional.

FIG. 4 is a flowchart illustrating an example of a processing procedure of the driving assistance device 1 according to the first embodiment of the present invention.

First, the data acquisition unit 111 acquires, via the input-output interface 13, an image captured by the camera 2 mounted on the automobile, and sensor data detected by the sensor 3, and stores the acquired data in the data storage unit 121 (S1).

Figures 6, 7:
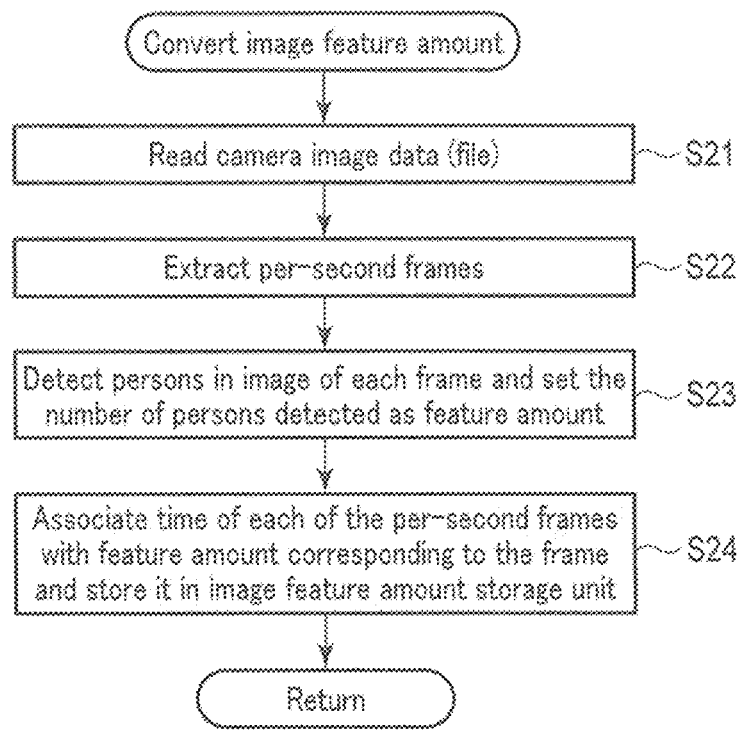
FIG. 6 illustrates, in a table format, a configuration example of sensor data handled by the driving assistance device according to the first embodiment of the present invention.
FIG. 7 is a flowchart illustrating an example of a processing procedure by an image feature amount converter of the driving assistance device according to the first embodiment of the present invention.

FIG. 5 illustrates an example of a camera image handled by the driving assistance device 1 according to the first embodiment of the present invention. FIG. 6 illustrates, in a table format, a configuration example of sensor data handled by the driving assistance device 1 according to the first embodiment of the present invention. FIG. 5 shows an image captured by the camera 2 mounted on the automobile, while FIG. 6 shows content of each item of sensor data.

The camera image is assumed to be of a high-vision quality in which the image is captured at 10 [fps]. Here, it is assumed that the camera image is handled as data stored as one file per minute in a format with an extension of "mp4" in which the capturing time is recorded at least as a time in units of seconds. The sensor data is assumed to be data of the running speed detected in a cycle of 1 [Hz].

The image feature amount converter 113 reads the camera image data stored in the data storage unit 121, and converts each frame image included in the camera image data into an image feature amount. The image feature amount converter 113 stores the image feature amount in the image feature amount storage unit 123 of the data storage 12 (S2).

Next, details of the process of S2 will be described as processes of S21 to S24 as follows. FIG. 7 is a flowchart illustrating an example of a processing procedure by the image feature amount converter 113 of the driving assistance device 1 according to the first embodiment of the present invention.

First, the image feature amount converter 113 reads the camera image data from the data storage unit 121 (S21). It is assumed that this data holds the capturing time as a time in units of seconds. Next, the image feature amount converter 113 performs a process of extracting an image of each per-second frame from the camera image data (S22). This process may be performed using a publicly known method such as ffmpeg.

Next, the image feature amount converter 113 detects persons from the image of each frame, and sets the number of persons detected as an image feature amount (S23). When a plurality of persons are included in the image of one frame, the number of persons detected is plural. In this case, the image feature amount converter 113 sets, for example, the detected number of persons as the feature amount.

In the first embodiment, the number of persons is given as an example of the feature amount that may affect the running speed of the automobile; however, the feature amount is not limited to this, and may be the number of four-wheeled vehicles or two-wheeled vehicles. The person detection process may be performed by a method such as publicly known Yolov2 (https://arxiv.org/abs/1612.08242).

Next, the image feature amount converter 113 performs a process of associating the time of each of the per-second frames with the feature amount corresponding to the frame, and storing the associated result in the image feature amount storage unit 123 (S24). FIG. 8 illustrates, in a table format, a configuration example of data stored in the image feature amount storage unit 123 of the driving assistance device 1 according to the first embodiment of the present invention. In this manner, S2 ends.

Next, the data fusion unit 115 performs a process of combining the image feature amount data stored in the image feature data storage unit 123 of the data memory 12 and the sensor data stored in the data storage unit 121 (S3).

Here, when the image feature amount data is in the format shown in FIG. 8 and the sensor data is in the format shown in FIG. 6, the data fusion unit 115 sets each time recorded in units of seconds in key information. By using the key information, the data fusion unit 115 combines the image feature amount in the image feature amount data and the running speed in the sensor data in the column direction. FIG. 9 illustrates, in a table format, a configuration example of the data combined by the data fusion unit 115 of the driving assistance device 1 according to the first embodiment of the present invention.

The driving assistance information learning unit 116 sets, among the data combined by the data fusion unit 115, for example, the running speed indicated by the sensor data as an objective variable, and at least part of the data excluding the running speed as an explanatory variable. The driving assistance information learning unit 116 performs a learning process for a driving assistance information learning model used for prediction from the explanatory variable to the objective variable, based on the data combined by the data fusion unit 115 (S4). Thereafter, the driving assistance information learning unit 116 stores the driving assistance information learning model obtained by the learning process in the driving assistance information learning model storage unit 125 of the data memory 12.

When the data combined by the data fusion unit 115 is in the format shown in FIG. 9, the driving assistance information learning unit 116 sets the speed column of the automobile as the objective variable, and the image feature amount as the explanatory variable, and performs the learning process for the driving assistance information learning model using the combined data. Here, as an example, if the driving assistance information learning unit 116 performs a regression analysis, which is an analysis for obtaining an objective variable from an explanatory variable, a regression coefficient can be obtained using a publicly known method.

The driving assistance information learning unit 116 performs a process of storing a regression coefficient for the image feature amount and a coefficient as a constant term in the driving assistance information learning model storage unit 125 as a driving assistance information learning model. Here, the learning process is not limited to the regression analysis described above, and may be, for example, a random forest.

Here, it is assumed that new camera image data and sensor data are input into the driving assistance device 1, and a process is performed by the data acquisition unit 111, the data storage unit 121, the image feature amount converter 113, the image feature amount storage unit 123, and the data fusion unit 115.

In this case, the driving assistance information generator 117 reads the image feature amount converted by the image feature amount converter 113 from the new camera image data among the data combined by the data fusion unit 115, and reads the driving assistance information learning model stored in the driving assistance information learning model storage unit 125 of the data memory 12. Based on the read image feature amount and the driving assistance information learning model, the driving assistance information generator 117 performs a process of predicting the target value of the running speed of the automobile as the driving assistance information (S5). In this manner, driving assistance information is generated.

When the driving assistance information learning model is the regression coefficient obtained by the regression analysis, the driving assistance information generator 117 adds the value of the coefficient as the constant term to the value obtained by multiplying the value of the column of the data read from the data combined by the data fusion unit 115 by the value of the regression coefficient corresponding to the column. Thereby, the target value of the running speed of the automobile can be predicted. If new data is input in units of one second, the driving assistance information generator 117 predicts the running speed of the automobile in units of one second, for example.

The driving assistance information generator 117 may perform the following prediction process. Specifically, the driving assistance information generator 117 reads the image feature amount included in the data combined by the data fusion unit 115, that is, the image feature amount converted from the new camera image data, and reads the driving assistance information learning model stored in the driving assistance information learning model storage unit 125 of the data memory 12.

The driving assistance information generator 117 performs a process of predicting the running speed of the automobile as the driving assistance information based on the read camera image data and the driving assistance information learning model.

The output unit 118 outputs the value of the running speed predicted by the driving assistance information generator 117 to the outside via the input-output interface 13 (S6).

(Effects)

In the present embodiment, the driving assistance device 1 can predict the running speed corresponding to the image feature amount extracted from the image of the front of the automobile by using the past camera image data. Accordingly, by comparing, by the driving assistance device 1 or its operator, the running speed predicted based on the past data when new sensor data is input with the running speed at the time of actual running indicated by the new sensor data, it is possible to look back to a dangerous driving place for the automobile or an individual driving habit. Therefore, since the driving assistance device 1 can be used for improvement, etc. of driving based on the comparison between the target value relating to the driving operation and the actual driving operation, the driving assistance information can be dynamically set according to the surrounding environment.

Furthermore, in the present embodiment, for generating the driving assistance information, the sensor data may not be used as long as the camera image data can be acquired. Therefore, even on a road for which there is no running data corresponding to map data, the driving assistance device 1 can obtain an image feature amount including information that may affect running data based on the camera image data during running, and use this image feature amount, thereby generating the driving assistance information. Accordingly, highly accurate driving assistance information can be obtained for an automobile running on a road for which there is no running data corresponding to map data.

Second Embodiment

Next, the second embodiment will be described.

Figure 10:
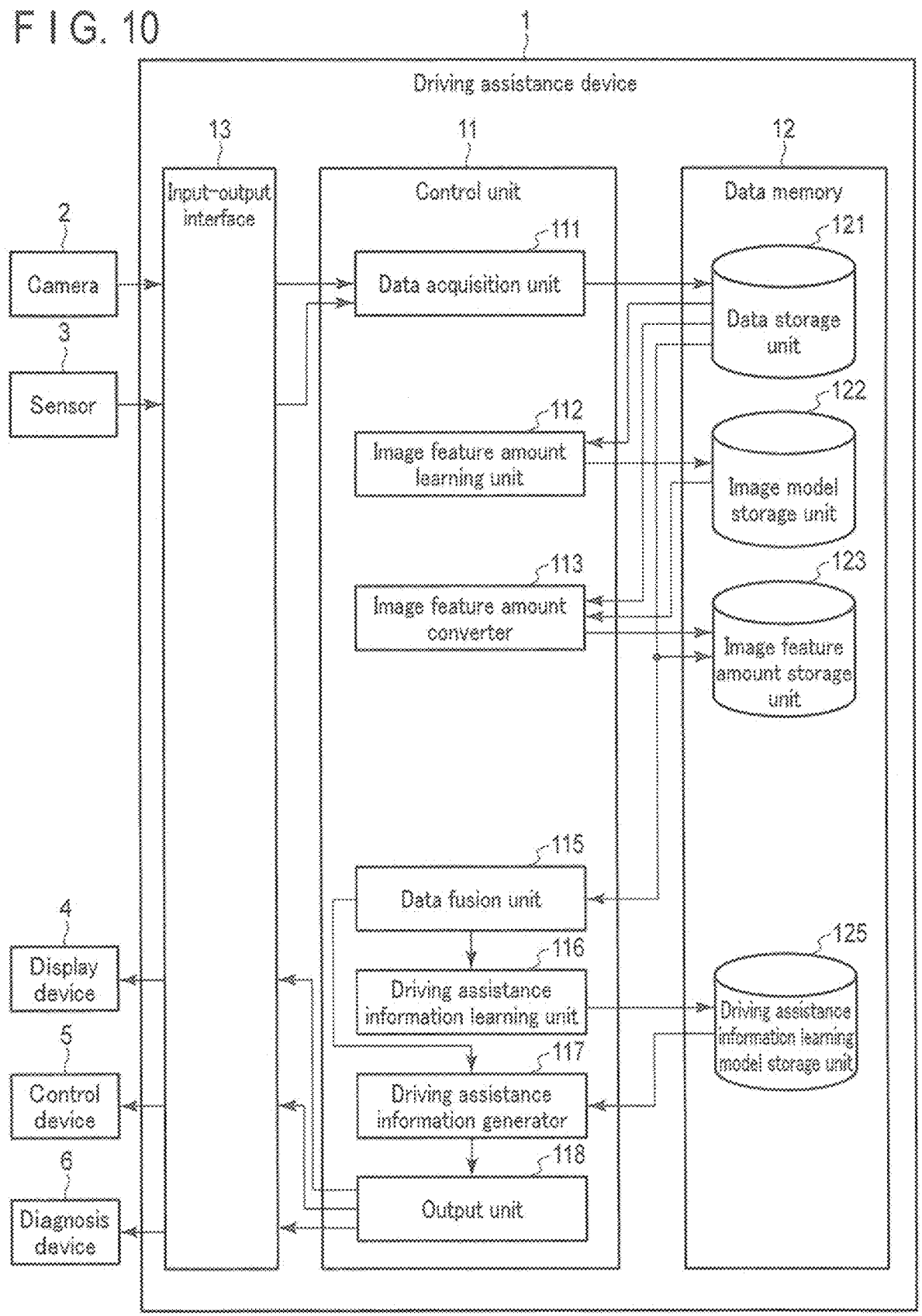
FIG. 10 is a block diagram illustrating an example of a software configuration of a driving assistance device according to a second embodiment of the present invention.

FIG. 10 is a block diagram illustrating an example of a software configuration of the driving assistance device 1 according to the second embodiment of the present invention. FIG. 10 shows the software configuration of the driving assistance device 1 according to the second embodiment in association with the hardware configuration illustrated in FIG. 1.

As shown in FIG. 10, in the second embodiment, the software configuration shown in FIG. 2 other than the sensor preprocessing unit 114 and the processed sensor-data storage unit 124 is functional. In the second embodiment, in comparison to the first embodiment, the image feature amount learning unit 112 and the image model storage unit 122 illustrated in FIG. 2 are further functional.

Unlike in the first embodiment, in the second embodiment, the process by the image feature amount converter 113 is executed based on the image model learned by the image feature amount learning unit 112 and stored in the image model storage unit 122.

The image feature amount learning unit 112 performs a learning process using an autoencoder so that as much as possible the features of the image are not impaired. FIG. 11 illustrates an example of a learning method by the image feature amount learning unit 112 of the driving assistance device 1 according to the second embodiment of the present invention.

For the input image shown in FIG. 11, an image of each frame obtained by extracting per-second frames from the camera image data (file) stored in the data storage unit 121 is used. Here, it is assumed that an image having a size of 360×640 and preprocessed to have a gray scale is used as the input image.

Values of 360×640×1 and the like shown in FIG. 11 indicate an image height, an image width, and the number of image channels, respectively. For example, an image having the number of image channels of one represents a gray-scaled image, and an image having the number of image channels of three represents an RGB image. Then, the image feature amount learning unit 112 performs region-based feature extraction by convolving the input image using convolution layers (Conv1, Conv2, Conv3, Conv4).

Next, the image feature amount learning unit 112 restores the image using deconvolution layers (DeConv1, DeConv2, DeConv3, DeConv4). The image feature amount learning unit 112 performs a learning process to minimize an error between the image reconstructed by the restoration (reconstructed image) and the original image (input image). This error corresponds to the mean squared error shown in FIG. 11.

"a" shown in FIG. 11 corresponds to a part processed by the image feature amount converter 113, while "b" shown in FIG. 11 corresponds to a part processed by the image feature amount learning unit 112.

The configuration shown in FIG. 11 is an example, and the number of convolution layers and the like are not particularly limited. The image model obtained as a result of learning is a value of a filter to be converted in each convolution layer, and is stored in the image model storage unit 122.

Figure 12:
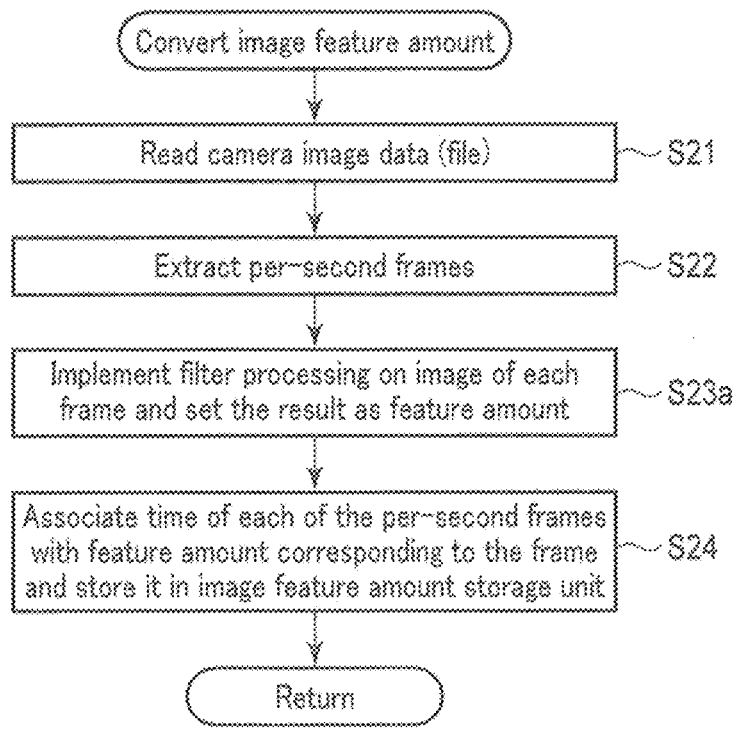
FIG. 12 is a flowchart illustrating an example of a processing procedure by an image feature amount converter of the driving assistance device according to the second embodiment of the present invention.

FIG. 12 is a flowchart illustrating an example of a processing procedure by the image feature amount converter 113 of the driving assistance device 1 according to the second embodiment of the present invention.

In the second embodiment, after S21 and S22 described in the first embodiment, the image feature amount converter 113 performs filter processing based on the image model stored in the image model storage unit 122 on the image of each frame obtained by extracting per-second frames from the camera image data (file) stored in the data storage unit 121 (S23a).

For example, in the example shown in FIG. 11, the image feature amount converter 113 sets data obtained by completing the processing of Conv1, Conv2, Conv3, and Conv4 on the image of each frame as an image feature amount.

Next, the image feature amount converter 113 performs a process of associating the time of each per-second frame and the feature amount corresponding to the frame, and storing the associated result in the image feature amount storage unit 123 (S24).

Figure 13:
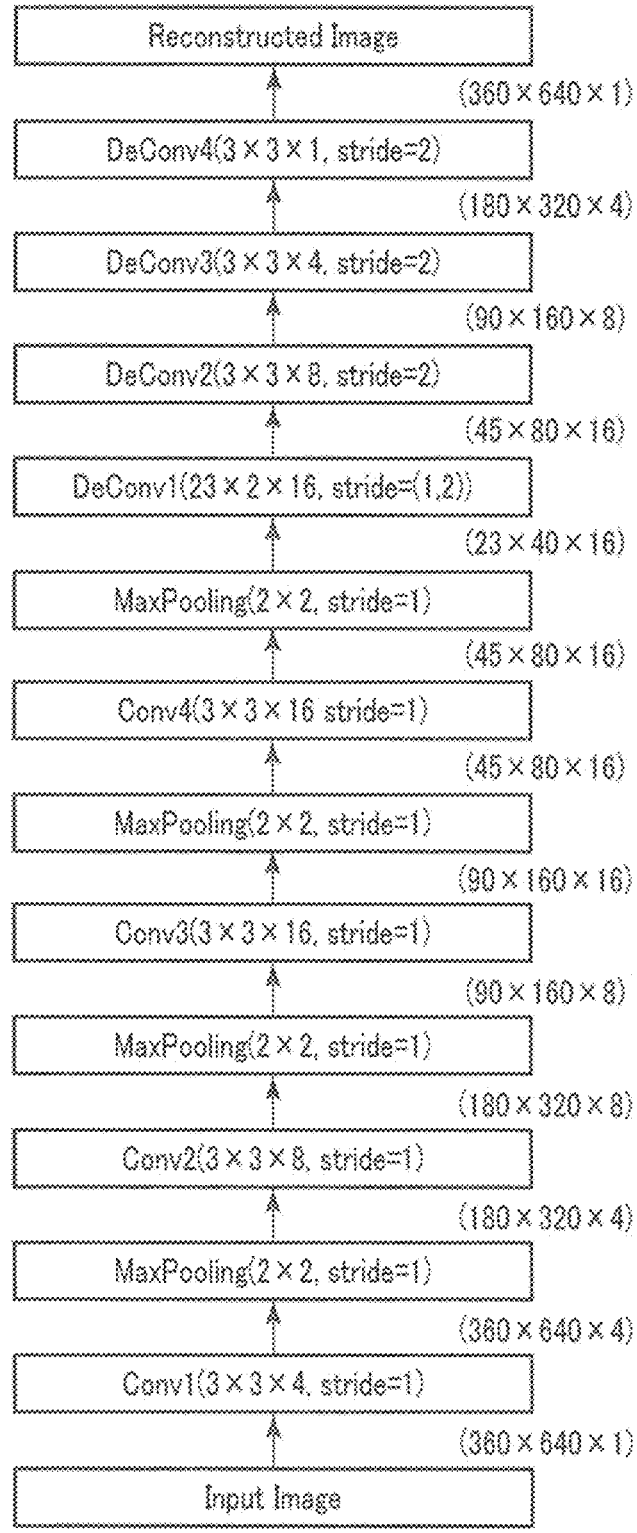
FIG. 13 illustrates a concrete example of a structure of a learning network used by an image feature amount learning unit of the driving assistance device according to the second embodiment of the present invention.

FIG. 13 illustrates a concrete example of a structure of a learning network used by an image feature amount learning unit 112 of the driving assistance device 1 according to the second embodiment of the present invention.

In the example illustrated in FIG. 13, a learning network used by the image feature amount learning unit 112, a convolutional neural network (CNN) here, includes preceding-stage layers and subsequent-stage layers.

The preceding-stage layers are formed by alternately stacking four convolution layers for performing convolution on the input image and four pooling layers (Max Pooling) shown in FIG. 13. The subsequent-stage layers are four deconvolution layers shown in FIG. 13.

The convolutional neural network has a structure in which an image is encoded by the preceding-stage layers, and for the result of encoding, the image is decoded by the four deconvolution layers of the subsequent-stage layers.

Values of the filter configured in each layer (e.g., (3×3×4, stride=1) of Conv1 shown in FIG. 13) indicate an image height, an image width, the number of image channels, and a stride of the filter. The stride indicates a convolution application interval. These values are learned so that the error between the input image and the reconstructed image can be minimized.

Figure 14:
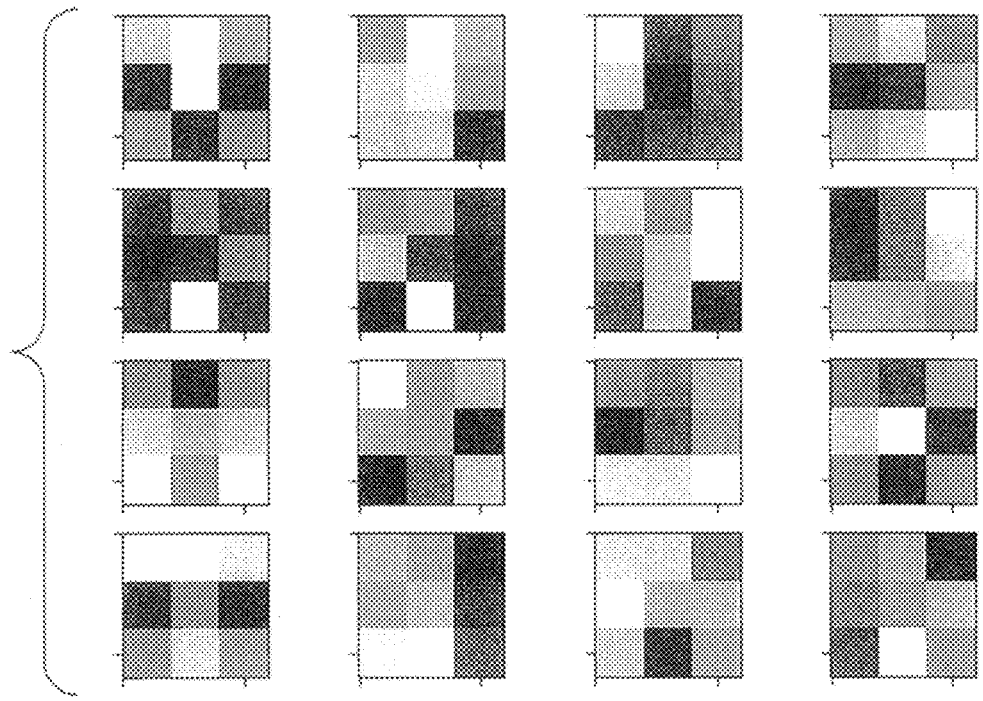
FIG. 14 illustrates an example of an image of a filter after learning by the image feature amount learning unit of the driving assistance device according to the second embodiment of the present invention.
Figure 15:
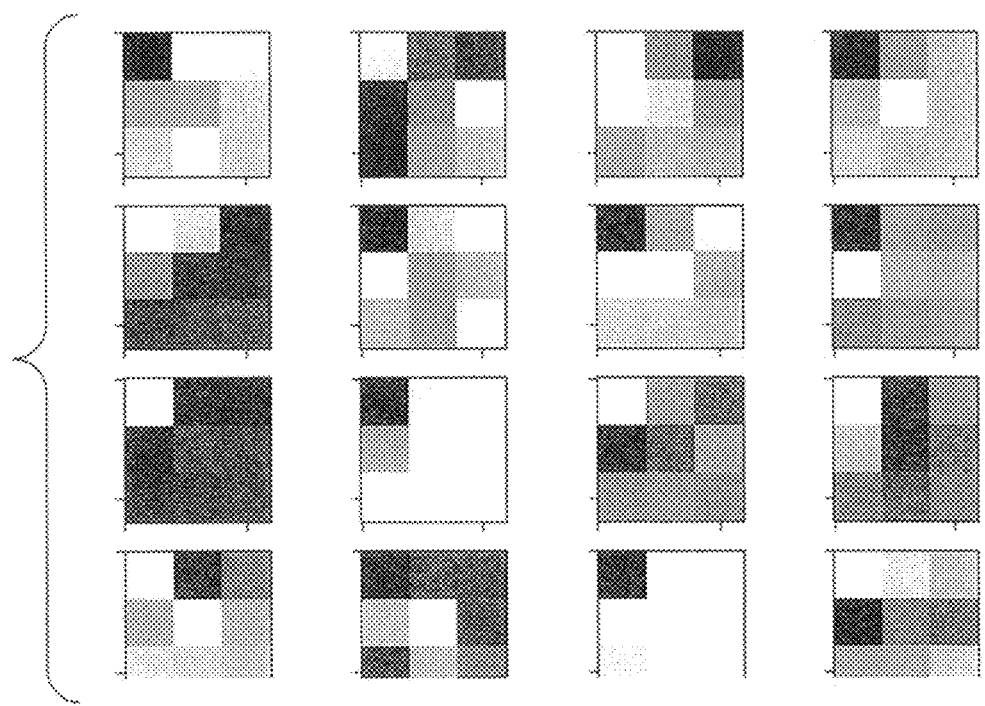
FIG. 15 illustrates an example of an image of a filter after learning by the image feature amount learning unit of the driving assistance device according to the second embodiment of the present invention.

FIGS. 14 and 15 each illustrate an example of the image of the filter after learning by the image feature amount learning unit 112 of the driving assistance device 1 according to the second embodiment of the present invention.

FIG. 14 shows an image in which, in Conv2 shown in FIG. 13, part of the result of learning the 3×3 filters is visualized. In regard to Conv2 shown in FIG. 13, eight filters for a four-channel image apply, in which one filter has information on four channels, and there are thirty-two 2D images having a size of 3×3. FIG. 15 shows an image in which in Conv4 shown in FIG. 13, part of the result of learning the 3×3 filters is visualized.

FIG. 16 illustrates an example of the encoding and decoding results by the image feature amount learning unit 112 of the driving assistance device 1 according to the second embodiment of the present invention.

"a" in FIG. 16 shows the original image of the input image.

"b" in FIG. 16 shows a visualized image resulting from calculating the image feature amount by performing encoding, that is, processing by the convolution layers and the pooling layers shown in FIG. 13, on the original image.

"c" in FIG. 16 shows an image restored by performing decoding on the result of calculating the image feature amount, that is, processing by the deconvolution layers shown in FIG. 13.

(Effects)

The second embodiment is different from the first embodiment in the method of capturing the image feature amount. In the first embodiment, the number of persons is given as an example of the image feature amount; however, a target that may affect the traveling of the automobile is not limited to a person.

The second embodiment performs conversion into an image feature amount by using an autoencoder that as much as possible does not impair the information amount of an image. Therefore, since information that may affect the traveling of the automobile is included as the image feature amount, it is possible to obtain a more accurate prediction result of the running speed in the driving assistance information generator 117. Therefore, the image included in the image data can be converted into the image feature amount with as little information loss as possible.

Third Embodiment

Next, the third embodiment will be described.

Similarly to the first embodiment, in the third embodiment, the software configuration illustrated in FIG. 2 other than the image feature amount learning unit 112, the sensor preprocessing unit 114, the image model storage unit 122, and the processed sensor-data storage unit 124 is functional.

However, unlike in the first embodiment, in the third embodiment, the driving assistance information learning unit 116 sets an automobile's future running speed or driving action as an objective variable, and performs a learning process for the driving assistance information learning model.

In the first example of the third embodiment, the driving assistance information learning unit 116 sets explanatory variables indicative of an image feature amount at time t and a running speed at time t among the data generated by the data fusion unit 115.

Next, in the first example, the driving assistance information learning unit 116 sets an objective variable using, as a label, a driving action to be taken by the driver among acceleration, constant speed, and deceleration of the automobile, expressed when the speed at time t and the speed at time t+n (for example, any of t+1, t+2, t+3, . . . ) are compared.

The objective variable indicates whether a driving action relating to a running speed at a time after a predetermined time with respect to a running speed at the predetermined time corresponds to any of a driving action for acceleration, a driving action for constant speed, or a driving action for deceleration.

The driving assistance information learning unit 116 performs a learning process for a driving assistance information learning model using data generated by the data fusion unit 115.

In the second example of the third embodiment, the driving assistance information learning unit 116 sets an image feature amount at time t and a running speed at time t as explanatory variables among the data generated by the data fusion unit 115, and sets a speed at time t+n as an objective variable.

The driving assistance information learning unit 116 performs a learning process for a driving assistance information learning model using data generated by the data fusion unit 115.

FIG. 17 illustrates an example of setting of an objective variable and an explanatory variable by the driving assistance information learning unit 116 of the driving assistance device 1 according to the third embodiment of the present invention.

"a" in FIG. 17 shows data generated by the data fusion unit 115. "b" in FIG. 17 corresponds to the first example described above, and shows a setting image of the objective variable and the explanatory variable when the above-described n is 1. "c" in FIG. 17 corresponds to the second example described above, and shows a setting image of the objective variable and the explanatory variable when the above-described n is 1.

Here, a description is given of a case where n is set to 1, that is, the speed or driving action one second ahead is predicted, but n is not limited to 1 and may be, for example, 2 or 3.

(Effects)

In the third embodiment, the method of setting an objective variable in the driving assistance information learning unit 116 is different from that of the first embodiment. In the third embodiment, learning for the driving assistance information learning model is performed so that a future, e.g., one second ahead, running speed or driving action of the automobile is predicted.

In the third embodiment, when new vehicle data of the automobile is input into the driving assistance information learning unit 116, a target value of a future acceleration/deceleration or speed of the automobile is obtained based on past data. Therefore, the driving assistance device 1 or the operator thereof can present it as the recommended acceleration/deceleration or speed to the driver, or use it as an automatic running speed of automatic driving. Therefore, the driving assistance device 1 can be used to improve driving based on the comparison between the target value of the driving action classified into, for example, acceleration, constant speed, and deceleration, and actual acceleration/deceleration. In addition, the driving assistance device 1 can be used to improve driving based on the comparison between the target value of the running speed and the actual running speed.

Fourth Embodiment

Next, the fourth embodiment will be described.

Similarly to the third embodiment, in the fourth embodiment, the software configuration illustrated in FIG. 2 other than the image feature amount learning unit 112, the sensor preprocessing unit 114, the image model storage unit 122, and the processed sensor-data storage unit 124 is functional. However, unlike in the third embodiment, in the fourth embodiment, in the process of the driving assistance information learning unit 116, the driving assistance information learning model learning process is performed upon setting of a future running speed of the automobile as an objective variable and past information as an explanatory variable.

In the first example of the fourth embodiment, the driving assistance information learning unit 116 sets variables reflecting the image feature amount and the running speed at each time from time t-n to time t as explanatory variables among data generated by the data fusion unit 115.

Next, in the first example, the driving assistance information learning unit 116 sets, as an objective variable, a variable using as a label a driving action to be taken by the driver among acceleration, constant speed, and deceleration of the automobile, expressed when the speed at time t and the speed at time t+n are compared.

The driving assistance information learning unit 116 performs a learning process for a driving assistance information learning model using data generated by the data fusion unit 115.

Moreover, in the second example of the fourth embodiment, the driving assistance information learning unit 116 sets, as explanatory variables, variables reflecting the image feature amount and the running speed at each time from time t-n to time t, among data generated by the data fusion unit 115.

Next, in the second example, the driving assistance information learning unit 116 sets the speed at time t+n as the objective variable.

The driving assistance information learning unit 116 performs a learning process for a driving assistance information learning model using data generated by the data fusion unit 115.

In the fourth embodiment, the trend at each time can be considered using a long short-term memory (LSTM) model as a learning method. The number of layers of the LSTM is one or more.

(Effects)

In the fourth embodiment, the method of setting explanatory variables in the driving assistance information learning unit 116 is different from that of the third embodiment. In the third embodiment, the driving assistance information learning model is learned so that the future, e.g., one second ahead, running speed of the automobile is predicted from the current information.

In contrast, in the fourth embodiment, the driving assistance information learning model is learned so that the future running speed is predicted in consideration of the image feature amount and running speed trend at the past time.

In the fourth embodiment, when new automobile vehicle data is input into the driving assistance information learning unit 116, the result of predicting the future running speed of the automobile is obtained in consideration of a travel trend such as acceleration or deceleration from the past to the present of the automobile based on past data.

For this reason, when the driving assistance device 1 or the operator thereof presents the predicted running speed to the driver as a recommended speed of the automobile or utilizes it as an automatic running speed of automatic driving, it is possible to perform driving assistance that is closer to the way of human driving and that causes no sense of discomfort in consideration of a traveling trend such as acceleration or deceleration.

Fifth Embodiment

In the fifth embodiment, the software configuration illustrated in FIG. 2 other than the image feature amount learning unit 112 and the image model storage unit 122 is functional. Moreover, in the fifth embodiment, in comparison to the first embodiment, the sensor preprocessing unit 114 and the processed sensor-data storage unit 124 illustrated in FIG. 2 are further functional.

Unlike in the first embodiment, in the fifth embodiment, sensor data is preprocessed by the sensor preprocessing unit 114 before the sensor data is combined by the data fusion unit 115.

Here, smoothing by function approximation and resampling will be described as an example of preprocessing. Here, it is assumed that the sensor 3 is a triaxial acceleration sensor, and the data acquisition unit 111 acquires, for example, data of triaxial acceleration (hereinafter, acceleration) of an automobile as sensor data. It is assumed that the acceleration is measured at a cycle of 100 [Hz], and the acceleration data is combined as 100 columns for one record of sensor data generated in units of one second.

Figure 18:
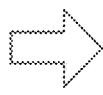
FIG. 18 illustrates an example of preprocessing by a sensor preprocessing unit of a driving assistance device according to a fifth embodiment of the present invention.

FIG. 18 illustrates an example of preprocessing by the sensor preprocessing unit 114 of the driving assistance device 1 according to the fifth embodiment of the present invention.

"a" in FIG. 18 indicates data of 100 columns from acceleration x-1 to acceleration x-100 in the sensor data. For this data, the sensor preprocessing unit 114 obtains a value after smoothing using a moving average method as a publicly known technique.

Alternatively, for the sensor data, the sensor preprocessing unit 114 obtains a value approximated by a polynomial using Savitzky-Golay (SG method) as a value after smoothing.

The sensor preprocessing unit 114 samples, for example, three columns at equal intervals from the smoothed value, and obtains the sampled result as sensor data after preprocessing.

In "b" shown in FIG. 18, the sampling result corresponds to the three columns of accelerations x-re1, x-re2, and x-re3. However, the number of columns for sampling is not limited to the three described above.

(Effects)

In the fifth embodiment, when the driving assistance information learning unit 116 sets the sensor data as the explanatory variable, the sensor preprocessing unit 114 performs preprocessing.

If data is obtained when the measurement interval of the sensor data is highly frequent such as 100 [Hz], for example, noise is included in the data, or the number of dimensions of data becomes too large.

Therefore, in the fifth embodiment, smoothing processing on sensor data is performed for the purpose of reducing noise, and the smoothed value is resampled, thereby reducing the number of dimensions.

By performing preprocessing in this manner, learning data of the driving assistance information learning unit 116 becomes high quality data, and the prediction accuracy of the objective variable can be improved as compared to the first embodiment.

(Others)

The present invention is not limited to the above embodiments. For example, the functional units included in the driving assistance device 1 may be distributed to different devices, and these devices may cooperate with each other to perform processing. Each functional unit may be realized using a circuit. The circuit may be a dedicated circuit for realizing a specific function, or a general-purpose circuit such as a processor.

In each of the embodiments described above, the sensor 3 mounted on the automobile measures the speed or acceleration of the running automobile; however, the present invention is not limited thereto, and the sensor 3 may be a sensor of an engine rotation speed of the automobile, and the engine rotation speed of the automobile may be measured by the sensor. Further, the present invention is not limited to the above, and the sensor 3 may measure other values relating to the running of the automobile, such as a fuel injection amount.

As a program (software means) that can be executed by a computer, the method described in each embodiment can be distributed by being stored in a storage medium such as a magnetic disk (a floppy disk (trademark), a hard disk, etc.), an optical disk (CD-ROM, DVD, MO, etc.), and a semiconductor memory (ROM, RAM, flash memory, etc.), or by being transmitted by a communication medium. The program stored on the medium side also includes a setting program for causing the software means that is to be executed by the computer (including not only an execution program but also a table structure and a data structure) to be configured in the computer. The computer that realizes the present device reads a program stored in a storage medium, and, in some cases, constructs software means by the setting program, and executes the above-mentioned processing by causing operations to be controlled by the software means. The storage medium referred to in this specification is not limited to distribution, and includes a storage medium such as a magnetic disk and a semiconductor memory provided in a device that is connected via the inside of the computer or a network.

The present invention is not limited to the above embodiments, and can be modified in various ways in practice when implementing the invention without departing from the gist of the invention. Furthermore, the above embodiments include inventions at various stages, and various inventions can be extracted by an appropriate combination of a plurality of disclosed constitutional requirements. For example, even if some constituent elements are deleted from all the constituent elements shown in the embodiments, when the problem can be solved and the effect can be obtained, the configuration from which the constituent elements are deleted can be extracted as the invention.

SUPPLEMENTARY NOTE

Some or all of the above-described embodiments can be described as in the following supplementary note in addition to the claims, but are not limited thereto.

[C1]

A driving assistance device, comprising:
- a data acquisition unit (111) that acquires image data captured in a running vehicle, and sensor data relating to a driving operation by a driver of the vehicle;
- an image feature amount converter (113) that converts an image in each frame included in the image data acquired by the data acquisition unit (111) into an image feature amount indicated by the image;
- a data fusion unit (115) that combines the image feature amount converted by the image feature amount converter (113) and the sensor data acquired by the data acquisition unit (111);
- a driving assistance information learning unit (116) that performs, using the data combined by the data fusion unit (115), a learning process for a driving assistance information learning model used when a target value relating to the driving operation by the driver of the vehicle is generated from the image feature amount included in the combined data;
- a driving assistance information learning model storage unit (125) that stores the driving assistance information learning model learned by the driving assistance information learning unit (116); and
- a driving assistance information generator (117) that generates, when new image data captured in the running vehicle is acquired by the data acquisition unit (111), the target value relating to the driving operation by the driver of the vehicle, as driving assistance information of the vehicle, based on the image feature amount converted by the image feature amount converter (113) from the acquired new image data and the driving assistance information learning model stored in the driving assistance information learning model storage unit (125).

[C2]

The driving assistance device according to [C1], further comprising:
- an image feature amount learning unit (112) that performs a learning process for an image feature amount learning model used for conversion from the image in each frame included in the image data captured in the running vehicle into the image feature amount based on the image in each frame included in the image data acquired by the data acquisition unit (111); and
- an image feature amount learning model storage unit (122) that stores the image feature amount learning model learned by the image feature amount learning unit (112),
- wherein the image feature amount converter (113) converts the image in each frame acquired by the data acquisition unit (111) into the image feature amount based on the image feature amount learning model stored in the image feature amount learning model storage unit (122).

[C3]

The driving assistance device according to [C1] or [C2], wherein
the sensor data is data indicative of a running speed of the vehicle, and
the driving assistance information learning unit (116) is configured to:
- set, among the data combined by the data fusion unit (115), an explanatory variable indicative of each of the image feature amount at a predetermined time and the running speed at the predetermined time, and an objective variable indicating that the running speed at a time after the predetermined time corresponds to any of acceleration, constant speed, or deceleration with respect to the running speed at the predetermined time; and
- perform, using the data combined by the data fusion unit (115), the learning process for the driving assistance information learning model used when the objective variable is predicted from the explanatory variable.

[C4]

The driving assistance device according to [C1] or [C2], wherein
the sensor data is data indicative of a running speed of the vehicle, and
the driving assistance information learning unit (116) is configured to:
- set, among the data combined by the data fusion unit (115), an explanatory variable indicative of each of the image feature amount at a predetermined time and the running speed at the predetermined time, and an objective variable indicative of the running speed at a time after the predetermined time; and
- perform, using the data combined by the data fusion unit (115), the learning process for the driving assistance information learning model used when the objective variable is predicted from the explanatory variable.

[C5]

The driving assistance device according to [C3] or [C4], wherein
the driving assistance information learning unit (116) is configured to:
- set, among the data combined by the data fusion unit (115), an explanatory variable indicative of each of the image feature amount at each time from a time retroactive from the predetermined time to the predetermined time and the running speed at each time; and
- learn, using the data combined by the data fusion unit (115), the driving assistance information learning model used when the objective variable is predicted from the explanatory variable.

[C6]

The driving assistance device according to [C1] or [C2], wherein the sensor data includes data indicative of acceleration or an engine speed of the vehicle.

[C7]

A driving assistance method performed by a driving assistance device, the method comprising:
- acquiring image data captured in a running vehicle, and sensor data relating to a driving operation by a driver of the vehicle;
- converting an image in each frame included in the acquired image data into an image feature amount indicated by the image;
- combining the converted image feature amount and the acquired sensor data;
- performing, using the combined data, a learning process for a driving assistance information learning model used when a target value relating to the driving operation by the driver of the vehicle is generated from the image feature amount included in the combined data; and generating, when new image data captured in the running vehicle is acquired, the target value relating to the driving operation by the driver of the vehicle, as driving assistance information of the vehicle, based on the image feature amount converted from the acquired new image data and the driving assistance information learning model.

[C8]

A driving assistance processing program causing a processor to function as each of the means of the driving assistance device according to any one of C1 to C6.

[C9]

The driving assistance device according to [C3], wherein the driving assistance information learning unit (116) is configured to:

set, among the data combined by the data fusion unit (115), an explanatory variable indicative of each of the image feature amount at each time from a time retroactive from the predetermined time to the predetermined time and the running speed at each time; and learn, using the data combined by the data fusion unit (115), a driving assistance information learning model used when the objective variable is predicted from the explanatory variable.

[C10]

The driving assistance device according to [C4], wherein the driving assistance information learning unit (116) is configured to:

set, among the data combined by the data fusion unit (115), an explanatory variable indicative of each of the image feature amount at each time from a time retroactive from the predetermined time to the predetermined time and the running speed at each time; and learn, using the data combined by the data fusion unit (115), the driving assistance information learning model used when the objective variable is predicted from the explanatory variable.

[C11]

The driving assistance device according to [C1] or [C2], wherein the sensor data includes data indicative of acceleration or an engine speed of the vehicle.

[C12]

A driving assistance method performed by a driving assistance device, the method comprising:

acquiring image data captured in a running vehicle, and sensor data relating to a driving operation by a driver of the vehicle;

converting an image in each frame included in the acquired image data into an image feature amount indicated by the image;

combining the converted image feature amount and the acquired sensor data;

performing, using the combined data, a learning process for a driving assistance information learning model used when a target value relating to the driving operation by the driver of the vehicle is generated from the image feature amount included in the combined data; and generating, when new image data captured in the running vehicle is acquired, the target value relating to the driving operation by the driver of the vehicle, as driving assistance information of the vehicle, based on the image feature amount converted from the acquired new image data and the driving assistance information learning model.

[C13]

A non-transitory tangible computer-readable storage medium having stored thereon a program for causing a hardware processor to execute:

acquiring image data captured in a running vehicle, and sensor data relating to a driving operation by a driver of the vehicle;

converting an image in each frame included in the acquired image data into an image feature amount indicated by the image;

combining the converted image feature amount and the acquired sensor data;

performing, using the combined data, a learning process for a driving assistance information learning model used when a target value relating to the driving operation by the driver of the vehicle is generated from the image feature amount included in the combined data; and generating, when new image data captured in the running vehicle is acquired, the target value relating to the driving operation by the driver of the vehicle, as driving assistance information of the vehicle, based on the image feature amount converted from the acquired new image data and the driving assistance information learning model.

REFERENCE SIGNS LIST

1. Driving assistance device
2. Camera
3. Sensor
4. Display device
5. Control device
6. Diagnosis device
11. Control unit
12. Data memory
13. Input-output interface
111. Data acquisition unit
112. Image feature amount learning unit
113. Image feature amount converter
114. Sensor preprocessing unit
115. Data fusion unit
116. Driving assistance information learning unit
117. Driving assistance information generator
118. Output unit
121. Data storage unit
122. Image model storage unit
123. Image feature amount storage unit
124. Processed sensor-data storage unit
125. Driving assistance information learning model storage unit

The invention claimed is:

1. A driving assistance device, comprising:
one or more processors; and
non-transitory computer readable medium comprising instructions executed by the one or more processors to perform to:
acquire image data captured in a running vehicle, and sensor data relating to a driving operation by a driver of the running vehicle;
convert an image in each frame included in the image data into an image feature amount indicated by the image;
combine the image feature amount converted and the sensor data acquired, the combining including column wise aligning the image feature amounts at times with speeds of the running vehicle from the sensor data at those times;

perform, based on combined data resulting from the combining, a learning process for a driving assistance information learning model used when a target value of a steering wheel angle of the vehicle relating to the driving operation by the driver of the running vehicle is generated from the image feature amount included in the combined data;

store the driving assistance information learning model subjected to learning process;

generate, when new image data captured in the running vehicle is acquired, the target value relating to the driving operation by the driver of the running vehicle, as driving assistance information of the running vehicle, based on the image feature amount converted by the image feature amount converter from the acquired new image data and the driving assistance information learning model stored; and automatically drive the vehicle based on the driving assistance information.

2. The driving assistance device according to claim 1, wherein the instructions, when executed, cause the one or more processors to further perform to:

perform a learning process for an image feature amount learning model used for conversion from the image in each frame included in the image data captured in the running vehicle into the image feature amount based on the image in each frame included in the image data acquired; and store the image feature amount learning model subjected to learning process, convert the image in each frame acquired into the image feature amount based on the image feature amount learning model stored.

3. The driving assistance device according to claim 2, wherein the sensor data is data indicative of a running speed of the running vehicle, and the instructions, when executed, cause the one or more processors to further perform to:

set, among the data combined, an explanatory variable indicative of each of the image feature amount at a predetermined time and the running speed at the predetermined time, and an objective variable indicating that the running speed at a time after the predetermined time corresponds to any of acceleration, constant speed, or deceleration with respect to the running speed at the predetermined time; and perform, using the data combined, the learning process for the driving assistance information learning model used when the objective variable is predicted from the explanatory variable.

4. The driving assistance device according to claim 3, wherein the instructions, when executed, cause the one or more processors to further perform to:

set, among the data combined, an explanatory variable indicative of each of the image feature amount extracted between from a time retroactive from the predetermined time and the predetermined time and the running speed at each time; and learn, using the data combined, the driving assistance information learning model used when the objective variable is predicted from the explanatory variable.

5. The driving assistance device according to claim 2, wherein the sensor data is data indicative of a running speed of the running vehicle, and the instructions, when executed, cause the one or more processors to further perform to:

set, among the data combined, an explanatory variable indicative of each of the image feature amount at a predetermined time and the running speed at the predetermined time, and an objective variable indicative of the running speed at a time after the predetermined time; and perform, using the data combined, the learning process for the driving assistance information learning model used when the objective variable is predicted from the explanatory variable.

6. The driving assistance device according to claim 5, wherein the instructions, when executed, cause the one or more processors to further perform to:

set, among the data combined, an explanatory variable indicative of each of the image feature amount extracted between from a time retroactive from the predetermined time and the predetermined time and the running speed at each time; and learn, using the data combined, the driving assistance information learning model used when the objective variable is predicted from the explanatory variable.

7. The driving assistance device according to claim 2, wherein the sensor data includes data indicative of acceleration or an engine speed of the running vehicle.

8. The driving assistance device according to claim 1, wherein the sensor data is data indicative of a running speed of the running vehicle, and the instructions, when executed, cause the one or more processors to perform to:

set, among the data combined, an explanatory variable indicative of each of the image feature amount at a predetermined time and the running speed at the predetermined time, and an objective variable indicating that the running speed at a time after the predetermined time corresponds to any of acceleration, constant speed, or deceleration with respect to the running speed at the predetermined time; and perform, using the data combined, the learning process for the driving assistance information learning model used when the objective variable is predicted from the explanatory variable.

9. The driving assistance device according to claim 8, wherein the instructions, when executed, cause the one or more processors to further perform to:

set, among the data combined, an explanatory variable indicative of each of the image feature amount extracted between a time retroactive from the predetermined time and the predetermined time and the running speed at each time; and learn, using the data combined, the driving assistance information learning model used when the objective variable is predicted from the explanatory variable.

10. The driving assistance device according to claim 1, wherein the sensor data is data indicative of a running speed of the running vehicle, and the instructions, when executed, cause the one or more processors to further perform to:

set, among the data combined, an explanatory variable indicative of each of the image feature amount at a predetermined time and the running speed at the predetermined time, and an objective variable indicative of the running speed at a time after the predetermined time; and perform, using the data combined by, the learning process for the driving assistance information learning model used when the objective variable is predicted from the explanatory variable.

11. The driving assistance device according to claim 10, wherein the instructions, when executed, cause the one or more processors to further perform to:

set, among the data combined an explanatory variable indicative of each of the image feature amount extracted between from a time retroactive from the predetermined time and the predetermined time and the running speed at each time; and learn, using the data combined, the driving assistance information learning model used when the objective variable is predicted from the explanatory variable.

12. The driving assistance device according to claim 1, wherein the sensor data includes data indicative of acceleration or an engine speed of the running vehicle.

13. A driving assistance method executed by a driving assistance device, the method comprising:

acquiring image data captured in a running vehicle, and sensor data relating to a driving operation by a driver of the running vehicle;

converting an image in each frame included in the acquired image data into an image feature amount indicated by the image;

combining the converted image feature amount and the acquired sensor data, the combining including column wise aligning the image feature amounts at times with speeds of the running vehicle from the sensor data at those times;

performing, using the combined data, a learning process for a driving assistance information learning model used when a target value of a steering wheel angle of the vehicle relating to the driving operation by the driver of the running vehicle is generated from the image feature amount included in the combined data;

generating, when new image data captured in the running vehicle is acquired, the target value relating to the driving operation by the driver of the vehicle, as driving assistance information of the vehicle, based on the image feature amount converted from the acquired new image data and the driving assistance information learning model; and automatically driving the vehicle based on the driving assistance information.

14. A non-transitory computer readable medium including instructions that, when executed a hardware processor perform the functions of:

acquiring image data captured in a running vehicle, and sensor data relating to a driving operation by a driver of the running vehicle;

converting an image in each frame included in the acquired image data into an image feature amount indicated by the image;

combining the converted image feature amount and the acquired sensor data, the combining including column wise aligning the image feature amounts at times with speeds of the running vehicle from the sensor data at those times;

performing, using the combined data, a learning process for a driving assistance information learning model used when a target value of a steering wheel angle of the vehicle relating to the driving operation by the driver of the running vehicle is generated from the image feature amount included in the combined data;

generating, when new image data captured in the running vehicle is acquired, the target value relating to the driving operation by the driver of the running vehicle, as driving assistance information of the running vehicle, based on the image feature amount converted from the acquired new image data and the driving assistance information learning model; and automatically driving the vehicle based on the driving assistance information.

* * * * *